United States Patent
Aoki

(10) Patent No.: US 11,192,204 B2
(45) Date of Patent: Dec. 7, 2021

(54) LASER MACHINING SYSTEM INCLUDING LASER MACHINING HEAD AND IMAGING DEVICE

(71) Applicant: FANUC CORPORATION, Yamanashi (JP)

(72) Inventor: Toshimichi Aoki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 415 days.

(21) Appl. No.: 15/887,352

(22) Filed: Feb. 2, 2018

(65) Prior Publication Data

US 2018/0221990 A1 Aug. 9, 2018

(30) Foreign Application Priority Data

Feb. 9, 2017 (JP) ............... JP2017-022269

(51) Int. Cl.
 *B23K 26/08* (2014.01)
 *B23K 26/04* (2014.01)
 *B25J 9/16* (2006.01)
 *G02B 26/10* (2006.01)
 *B23K 26/082* (2014.01)
 *B23K 26/03* (2006.01)

(52) U.S. Cl.
 CPC ........ *B23K 26/0884* (2013.01); *B23K 26/032* (2013.01); *B23K 26/04* (2013.01); *B23K 26/082* (2015.10); *B25J 9/1664* (2013.01); *B25J 9/1697* (2013.01); *G02B 26/10* (2013.01); *G02B 26/101* (2013.01); *G05B 2219/39449* (2013.01); *G05B 2219/40613* (2013.01); *G05B 2219/45104* (2013.01)

(58) Field of Classification Search
 CPC .... B23K 26/08; B23K 26/04; B23K 26/0884; B23K 26/082; B23K 26/032; B25J 9/16; B25J 9/1664; G02B 26/10; G02B 26/101; G05B 2219/39449; G05B 2219/40613; G05B 2219/45104
 USPC .............. 219/121.6–121.86, 121.67, 121.68, 219/121.83
 See application file for complete search history.

(56) References Cited

U.S. PATENT DOCUMENTS

| | | | | |
|---|---|---|---|---|
| 4,920,249 A | * | 4/1990 | McLaughlin | B23K 9/0956 219/124.34 |
| 5,204,814 A | * | 4/1993 | Noonan | G05D 1/0274 701/25 |
| 5,233,150 A | * | 8/1993 | Schneebeli | B23K 9/046 219/76.14 |
| 5,533,146 A | * | 7/1996 | Iwai | B23K 9/0956 219/121.63 |
| 5,552,575 A | * | 9/1996 | Doumanidis | B23K 9/0953 219/121.14 |

(Continued)

FOREIGN PATENT DOCUMENTS

| | | |
|---|---|---|
| CN | 101142052 A | 3/2008 |
| CN | 103620341 A | 3/2014 |

(Continued)

*Primary Examiner* — Jimmy Chou
(74) *Attorney, Agent, or Firm* — RatnerPrestia

(57) ABSTRACT

A machining system includes a laser irradiation device, a camera that captures an image of a workpiece, and a display that displays the image captured by the camera. The machining system includes a robot control device that controls the camera and the display. The camera captures the image of the workpiece before machining. The robot control device calculates a laser-beam irradiation position on the workpiece and virtually displays the laser-beam irradiation position on the display so as to overlap the workpiece image captured by the camera.

8 Claims, 8 Drawing Sheets

(56) References Cited

U.S. PATENT DOCUMENTS

| | | | | |
|---|---|---|---|---|
| 5,689,327 A * | 11/1997 | Takeda | B23K 26/16 219/121.6 |
| 5,718,832 A * | 2/1998 | Mori | B23K 26/032 219/121.67 |
| 6,043,452 A * | 3/2000 | Bestenlehrer | B23K 26/032 219/121.62 |
| 6,066,829 A * | 5/2000 | Ishikawa | B23K 26/02 219/121.68 |
| 6,073,464 A * | 6/2000 | Boher | B24B 37/013 65/378 |
| 6,430,472 B1 * | 8/2002 | Boillot | G05B 19/056 219/121.61 |
| 6,617,544 B1 * | 9/2003 | Tsukamoto | B23K 26/08 219/121.79 |
| 6,657,156 B2 * | 12/2003 | Kubota | B23K 26/04 219/121.63 |
| 6,839,042 B2 * | 1/2005 | Conemac | G09G 3/02 345/108 |
| 6,860,132 B2 * | 3/2005 | Butscher | G06Q 50/24 72/302 |
| 6,974,930 B2 * | 12/2005 | Jense | B23K 26/0846 219/121.8 |
| 7,248,940 B2 * | 7/2007 | Neumann | B23K 26/046 219/121.6 |
| 7,405,377 B2 * | 7/2008 | James | B23K 31/12 219/130.01 |
| 7,595,933 B2 * | 9/2009 | Tang | G02B 27/0172 345/8 |
| 7,633,033 B2 * | 12/2009 | Thomas | B23K 26/03 219/121.62 |
| 7,800,014 B2 * | 9/2010 | Thomas | B23K 26/0652 219/121.62 |
| 7,904,201 B2 * | 3/2011 | Nagatsuka | B25J 9/1682 700/245 |
| 8,084,708 B2 * | 12/2011 | Andreasch | B23K 26/04 219/121.62 |
| 8,168,919 B2 * | 5/2012 | Hamaguchi | B25J 9/1671 219/121.63 |
| 8,198,565 B2 * | 6/2012 | Lu | B23K 26/0613 219/121.63 |
| 8,389,963 B2 * | 3/2013 | Kubota | B23K 26/355 250/492.1 |
| 8,399,802 B2 * | 3/2013 | Idaka | B23K 26/082 219/121.83 |
| 8,428,776 B2 * | 4/2013 | Letsky | A01D 34/008 700/245 |
| 8,471,182 B2 * | 6/2013 | Stauffer | H05H 1/3405 219/617 |
| 8,487,209 B2 * | 7/2013 | Sakamoto | B23K 26/0884 219/121.63 |
| 8,536,483 B2 * | 9/2013 | Thomas | B23K 26/03 219/121.68 |
| 8,742,290 B2 * | 6/2014 | Oe | B23K 26/08 219/124.22 |
| 9,286,725 B2 | 3/2016 | Vasquez, II | G06T 19/006 |
| 9,327,406 B1 * | 5/2016 | Hinterstoisser | B25J 9/1697 |
| 10,413,994 B2 * | 9/2019 | Aoki | H04N 5/23293 |
| 10,654,132 B2 * | 5/2020 | Matsumoto | B23K 26/38 |
| 2004/0124227 A1 * | 7/2004 | Seki | B23K 31/125 228/103 |
| 2004/0206735 A1 * | 10/2004 | Okuda | B23K 26/0884 219/121.78 |
| 2005/0102060 A1 * | 5/2005 | Watanabe | B25J 9/1697 700/245 |
| 2005/0107919 A1 * | 5/2005 | Watanabe | G05B 19/4093 700/245 |
| 2005/0150876 A1 * | 7/2005 | Menin | B23K 26/082 219/121.63 |
| 2005/0150878 A1 * | 7/2005 | Thomas | B23K 26/03 219/121.68 |
| 2005/0258152 A1 * | 11/2005 | Kawamoto | B29C 66/961 219/121.62 |
| 2005/0269302 A1 * | 12/2005 | Horn | B23K 26/702 219/121.78 |
| 2006/0060573 A1 * | 3/2006 | Becker | B23K 26/0884 219/121.64 |
| 2006/0175301 A1 * | 8/2006 | Rippl | B23K 26/0884 219/121.8 |
| 2006/0226128 A1 * | 10/2006 | Otsuka | B23K 26/0884 219/121.64 |
| 2006/0235564 A1 * | 10/2006 | Troitski | B44F 1/04 700/166 |
| 2007/0075054 A1 * | 4/2007 | Nakamura | B23K 26/21 219/121.61 |
| 2007/0210040 A1 * | 9/2007 | Sakamoto | B23K 26/082 219/121.63 |
| 2008/0006615 A1 * | 1/2008 | Rosario | C04B 41/0045 219/121.68 |
| 2008/0017619 A1 * | 1/2008 | Yamakawa | B23K 26/032 219/121.81 |
| 2008/0035619 A1 * | 2/2008 | Hamaguchi | B23K 26/0884 219/121.79 |
| 2008/0136065 A1 * | 6/2008 | Ohlinger | B23K 26/36 264/482 |
| 2008/0172143 A1 * | 7/2008 | Schwarz | B23K 26/22 700/166 |
| 2009/0230100 A1 * | 9/2009 | Menin | B23K 26/0884 219/121.63 |
| 2010/0038347 A1 * | 2/2010 | Schwarz | B23K 26/0861 219/121.64 |
| 2010/0044357 A1 * | 2/2010 | Thomas | B23K 26/361 219/121.69 |
| 2010/0155375 A1 * | 6/2010 | Dietz | B23K 26/046 219/121.18 |
| 2010/0164739 A1 * | 7/2010 | Heberer | B23K 26/032 340/679 |
| 2010/0219171 A1 * | 9/2010 | Sato | B23K 26/04 219/121.75 |
| 2010/0272961 A1 * | 10/2010 | Costin, Jr. | G05B 13/00 428/156 |
| 2010/0314362 A1 * | 12/2010 | Albrecht | B23K 26/348 219/121.63 |
| 2011/0120978 A1 * | 5/2011 | Takahashi | B23K 11/258 219/86.25 |
| 2011/0139752 A1 * | 6/2011 | Carter | B23K 26/389 219/121.7 |
| 2012/0241425 A1 * | 9/2012 | Harada | B23K 26/082 219/121.72 |
| 2012/0255937 A1 * | 10/2012 | Oe | B23K 26/26 219/121.63 |
| 2012/0255938 A1 * | 10/2012 | Oe | B23K 26/082 219/124.22 |
| 2013/0343640 A1 * | 12/2013 | Buehler | B25J 9/0087 382/155 |
| 2014/0104621 A1 | 4/2014 | Ichimaru | |
| 2014/0312015 A1 * | 10/2014 | Kurachi | B41J 2/1634 219/121.71 |
| 2014/0375794 A1 * | 12/2014 | Singh | G01B 11/14 348/95 |
| 2015/0211083 A1 * | 7/2015 | Gabilondo | B23K 26/082 700/166 |
| 2016/0059347 A1 * | 3/2016 | Kogel-Hollacher | B23K 26/046 219/121.74 |
| 2016/0260259 A1 * | 9/2016 | Rueb | G06T 7/73 |
| 2017/0045877 A1 * | 2/2017 | Shapiro | B23K 37/0235 |
| 2018/0009059 A1 * | 1/2018 | Aoki | B23K 26/032 |
| 2018/0144503 A1 * | 5/2018 | Hamadou | G06T 7/80 |
| 2018/0333805 A1 * | 11/2018 | Matsumoto | B23K 26/0884 |
| 2019/0101443 A1 * | 4/2019 | Odanaka | G01J 1/4257 |

FOREIGN PATENT DOCUMENTS

| | | | |
|---|---|---|---|
| CN | 205074679 U | 3/2016 | |
| DE | 19727957 A1 | 1/1998 | |
| EP | 1826643 A1 * | 8/2007 | B23K 26/0884 |
| JP | H 05-177374 A | 7/1993 | |
| JP | 10058167 A | 3/1998 | |

(56) References Cited

FOREIGN PATENT DOCUMENTS

| | | | |
|---|---|---|---|
| JP | H10085962 A | | 4/1998 |
| JP | 2000-42775 A | | 2/2000 |
| JP | 2011079016 A | | 4/2011 |
| JP | 2012-157867 A | | 8/2012 |
| JP | 2012157867 A | * | 8/2012 |
| JP | 5577927 B | | 8/2014 |
| WO | 2016131018 A1 | | 8/2016 |

* cited by examiner

LASER MACHINING SYSTEM INCLUDING LASER MACHINING HEAD AND IMAGING DEVICE

CROSS-REFERENCE TO RELATED APPLICATIONS

This application is a new U.S. Patent Application that claims benefit of Japanese Patent Application No. 2017-022269, filed Feb. 9, 2017, the disclosure of this application being incorporated herein by reference in its entirety for all purposes.

BACKGROUND OF THE INVENTION

1. Field of the Invention

The present invention relates to a machining system including a laser machining head and an imaging device.

2. Description of Related Art

In the related art, remote laser machining in which a laser beam is outputted from a laser machining head so as to machine a workpiece is known. In such remote laser machining, a predetermined distance is set between the laser machining head and the workpiece. The laser machining head is moved while being supported by, for example, a robot. The direction of the laser beam that is outputted from the laser machining head is changed so as to machine the workpiece into a desired shape.

An operator performs a teaching operation for setting a laser-beam irradiation position on the workpiece before machining. In the teaching operation, the operator determines the output direction of the laser beam. For example, the operator adjusts the position and orientation of the robot that supports the laser machining head and a mechanism that is disposed in the laser machining head and changes the output direction. The operator stores the adjusted position and orientation of the robot in a storage unit. The machining system can automatically irradiate the workpiece with the laser beam based on the position and orientation that is stored in the storage unit.

In the teaching operation, the laser machining head is separated from the workpiece, and thus the laser-beam irradiation position on the workpiece is not easily recognized by the operator. Hence, the operator typically performs the teaching operation while irradiating the workpiece with a guide laser beam in order to visually confirm the irradiation position on a workpiece (for example, refer to Japanese Unexamined Patent Publication No. 2012-157867 and Japanese Unexamined Patent Publication No. 2000-42775).

Moreover, in the related art, a device which captures an image of a workpiece after laser machining and then evaluates the quality of machining based on the captured image is known (for example, refer to Japanese Patent No. 5577927 and Japanese Unexamined Patent Publication No. 5-177374).

SUMMARY OF INVENTION

In a teaching operation, the operator manually adjusts the direction of the laser beam while irradiating a workpiece with a guide laser beam. If the guide laser beam is not irradiated, it is difficult for the operator to confirm the laser-beam irradiation position. It is necessary for the operator to adjust the position and orientation of a robot and a mechanism for changing an output direction in a laser machining head while confirming the irradiation position of the guide laser beam. For example, it is necessary for the operator to perform the teaching operation while visually confirming the workpiece and the operation panel of the robot.

Thus, the teaching operation requires significant time and effort in the related art. Moreover, the light source of the guide laser beam has a limited life time, and thus the guide laser beam cannot be continuously emitted for an extended period of time.

A machining system according to an aspect of the present disclosure includes a laser machining head that outputs a laser beam to a workpiece from a position that is separated from the workpiece. The machining system includes an imaging device that captures an image of the workpiece, a display that displays the image captured by the imaging device, and a control device that controls the imaging device and the display. The imaging device captures an image of the workpiece before machining or an image of the workpiece during a machining period. The control device virtually displays a laser-beam irradiation position on the workpiece on the display so as to overlap the workpiece image captured by the imaging device.

DETAILED DESCRIPTION

Referring to FIGS. 1 to 10, a machining system according to an embodiment will be described below. In the machining system of the present embodiment, a laser beam is emitted to a workpiece so as to machine the workpiece. In the present embodiment, welding will be discussed as an example of laser beam machining.

Figure 1:
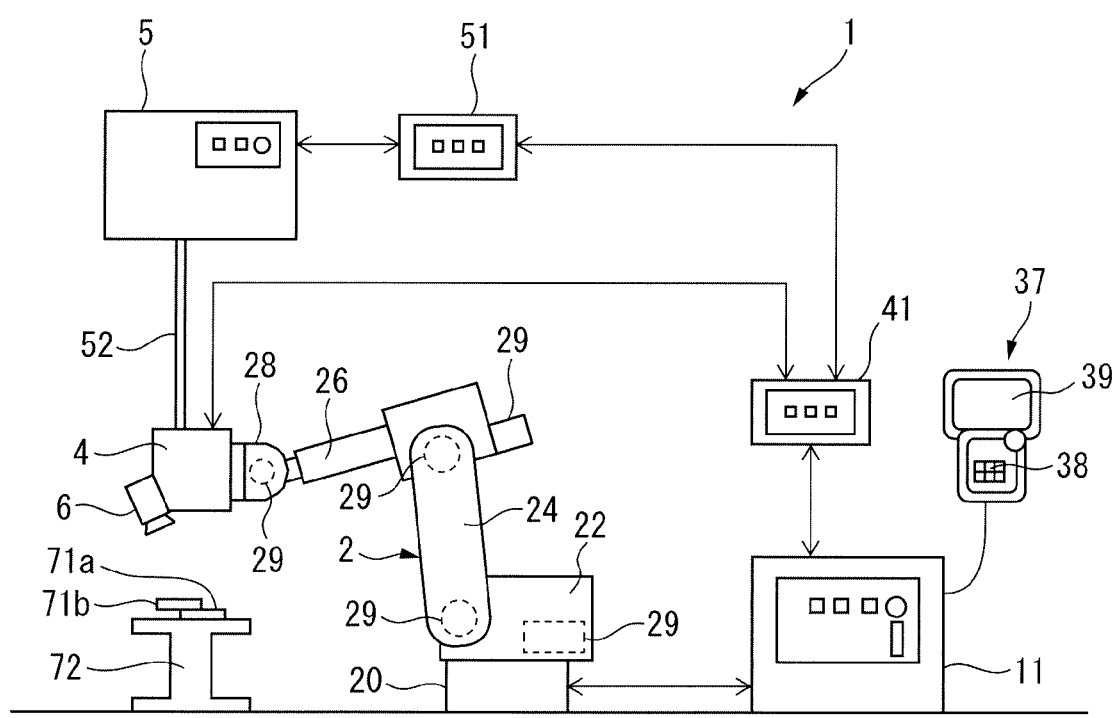
FIG. 1 is a schematic diagram showing first machining system according to an embodiment.
Figure 2:
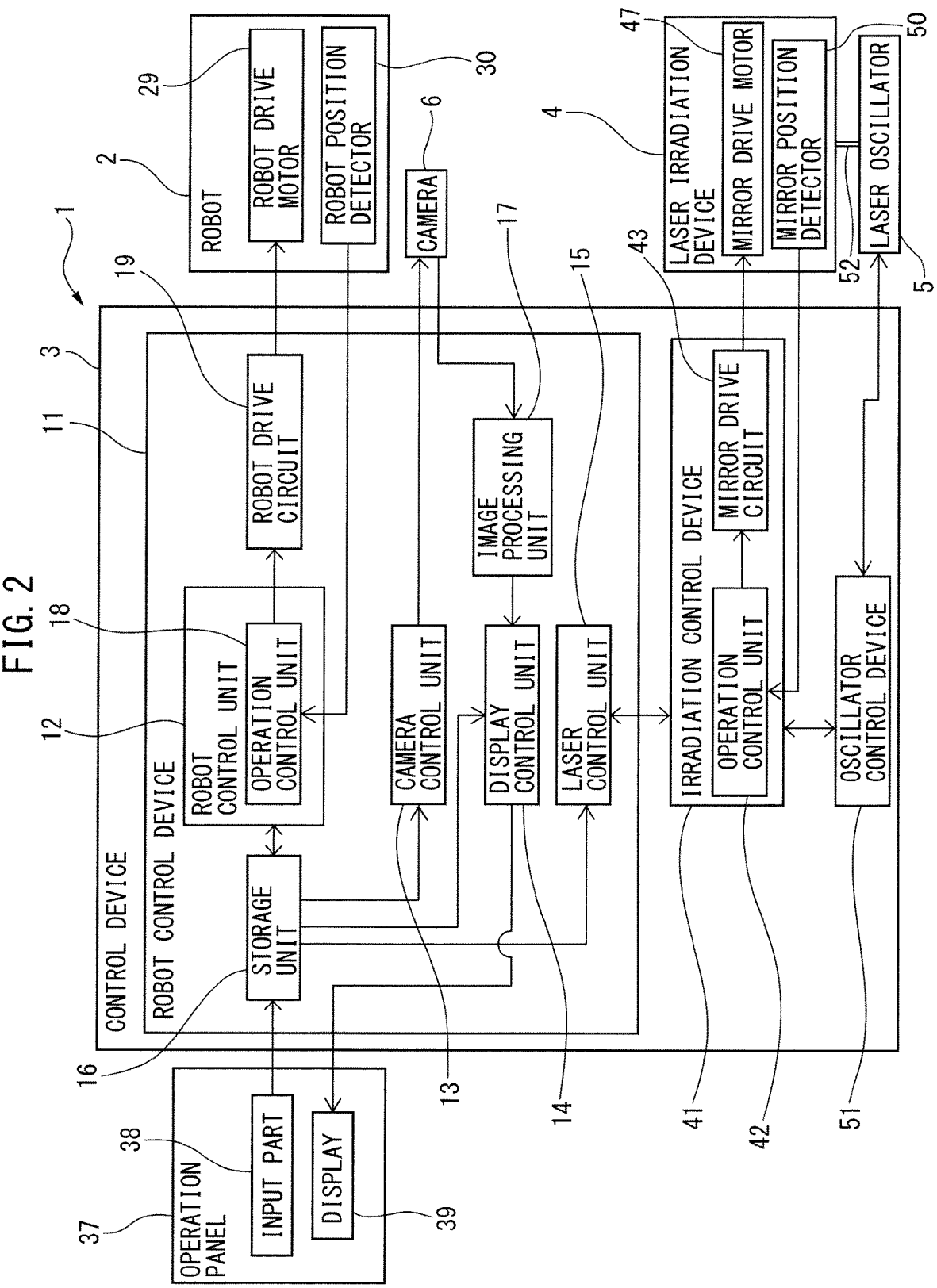
FIG. 2 is a block diagram showing the first machining system according to the embodiment.

FIG. 1 is a schematic diagram showing first machining system according to the present embodiment. FIG. 2 is a block diagram showing the first machining system according to the present embodiment. In the machining system of the present embodiment, the remote laser machining is performed in which a laser beam is outputted to a workpiece from a position that is separated from the workpiece. The workpiece and a laser machining head are separated from each other by at least a predetermined length, e.g., at least several tens of centimeters.

Referring to FIGS. 1 and 2, a machining system 1 emits the laser beam to workpieces 71a and 71b serving as an object to be machined. The machining system 1 includes a laser irradiation device 4 serving as a laser machining head that outputs the laser beam to the workpiece from a position separated from the workpiece. The machining system 1 includes a laser oscillator 5 that oscillates the laser beam. The laser beam that is oscillated by the laser oscillator 5 is supplied to the laser irradiation device 4 through an optical fiber 52.

The laser oscillator 5 is a light source that oscillates the laser beam for machining the workpiece. The laser oscillator 5 can be any light source for machining the workpieces 71a and 71b. For example, any types of light sources, such as a fiber laser, a carbon dioxide gas laser, and a YAG laser, can be used.

The machining system 1 includes a robot 2 serving as a support device for supporting the laser irradiation device 4. The robot 2 of the present embodiment is an articulated robot that has a plurality of joint parts. The robot 2 includes a pedestal 20 that is installed on a floor and a swivel base 22 that is configured to rotate about a vertically extending axis. The robot 2 includes a lower arm 24 that is pivotally supported by the swivel base 22 and an upper arm 26 that is pivotally supported by the lower arm 24. The robot 2 includes a wrist part 28 rotatably supported by the upper arm 26.

The robot 2 includes a robot drive motors 29 that drives the swivel base 22, the lower arm 24, the upper arm 26, and the wrist part 28. The robot drive motors 29 is driven so as to change the position and orientation of the robot 2. The robot is not limited to this configuration. Any robot is usable as long as the position and orientation of the laser irradiation device can be changed.

The machining system 1 of the present embodiment is formed such that the position and orientation of the laser irradiation device 4 relative to the workpieces 71a and 71b can be changed. The workpieces 71a and 71b are fixed to a pedestal 72. The robot 2 moves the laser irradiation device 4 so as to change the position of the laser irradiation device 4 relative to the workpieces 71a and 71b. The robot 2 of the present embodiment functions as an adjustment mechanism that adjusts the direction of the laser beam outputted from the laser irradiation device 4. Specifically, the direction of the laser beam outputted from the laser irradiation device 4 can be adjusted by changing the position and orientation of the robot 2.

The support device for supporting the laser irradiation device 4 is not limited to the robot. Any device that is capable of supporting the laser irradiation device can be used. For example, the support device can be configured to move the laser irradiation device in one direction without joint parts. The robot system may not be provided with the adjustment mechanism that adjusts the direction of the laser beam. For example, the support device for supporting the laser irradiation device may not have the function of moving the laser irradiation device.

The machining system 1 includes an imaging device that captures an image of the workpiece. The imaging device of the present embodiment includes a camera 6 that is fixed to the laser irradiation device 4. The camera 6 is disposed so as to capture images of the surfaces of the workpieces 71a and 71b that is fixed to the pedestal 72. The camera 6 of the present embodiment moves with the laser irradiation device 4. The camera 6 of the present embodiment is a two-dimensional camera that captures a two-dimensional image.

Figure 3:
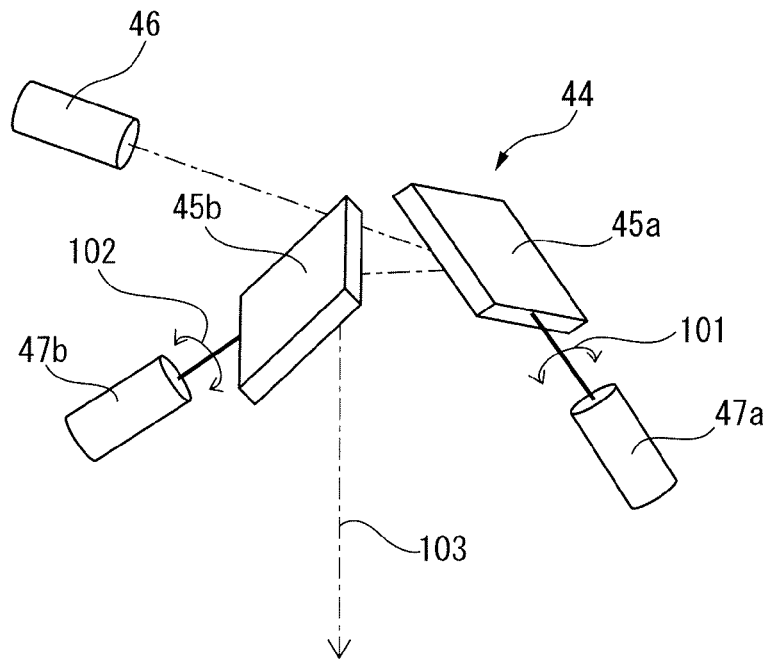
FIG. 3 is a schematic diagram showing the internal mechanism of a galvanoscanner.

FIG. 3 is a schematic diagram showing an internal mechanism of the laser irradiation device according to the present embodiment. Referring to FIGS. 1 and 3, the laser irradiation device 4 outputs the laser beam from an output port. The laser irradiation device 4 of the present embodiment includes a drive mechanism that drives a lens for adjusting focal length. Furthermore, the laser irradiation device 4 includes an output-direction adjustment mechanism 44 that adjusts the direction of the laser beam outputted from the laser irradiation device 4. The output-direction adjustment mechanism 44 changes the direction of an outputted laser beam in the laser irradiation device 4. The output-direction adjustment mechanism 44 functions as the adjustment mechanism that adjusts the direction of the laser beam that is outputted from the laser machining head.

The laser irradiation device 4 includes a laser light source 46 that oscillates the laser beam, a plurality of reflector plates, and a mirror drive motor. The laser irradiation device 4 has a galvano mechanism. In the example of FIG. 3, the reflector plates include an X-axis mirror 45a that adjusts the output direction in the X-axis direction and a Y-axis mirror 45b that adjusts the output direction in the Y-axis direction. The laser beam that is outputted from the laser light source 46 is reflected on the X-axis mirror 45a and the Y-axis mirror 45b. Thus, as indicated by arrow 103, the laser beam is outputted to the workpiece.

When an X-axis motor 47a changes the orientation of the X-axis mirror 45a as indicated by arrow 101, the output direction of the laser beam is changed in the X-axis direction. When a Y-axis motor 47b changes the orientation of the Y-axis mirror 45b as indicated by arrow 102, the output direction of the laser beam is changed in the Y-axis direction. The orientation of the X-axis mirror 45a and the orientation of the Y-axis mirror 45b are adjusted so as to adjust the direction of the laser beam outputted as indicated by arrow 103.

In this way, the laser irradiation device 4 controls the reflection angles of the laser beam on the X-axis mirror 45a and the Y-axis mirror 45b so as to two-dimensionally control laser-beam irradiation positions on the workpieces 71a and 71b. The laser irradiation device 4 thus configured is called a galvanoscanner.

Referring to FIGS. 1 and 2, the machining system 1 includes an operation panel 37 that is connected to a robot control device 11 via a communication device. The operation panel 37 functions as a user interface that operates a control device 3 and displays information. The operation panel 37 includes an input part 38 for inputting information on the robot 2, the camera 6, the laser irradiation device 4, and the laser oscillator 5. The input part 38 includes a keyboard, a dial, and the like. The operator operates the input part 38 so as to input, for example, an operation program and a criterion value to the robot control device 11.

The operation panel 37 includes a display 39 that displays information on the robot 2, the camera 6, the laser irradiation device 4, and the laser oscillator 5. The display 39 displays an image captured by the camera 6. A touch panel system is used for the display 39 of the present embodiment. The operator can press the screen or move a finger along the screen of the display 39 so as to input information. Thus, the display 39 of the present embodiment has the function of the input part 38.

The machining system 1 of the present embodiment includes the control device 3 that controls the robot 2 and the laser irradiation device 4. The control device 3 of the present embodiment also controls the camera 6 and the laser oscillator 5. The control device 3 includes a robot control device 11 that controls the robot 2 and the camera 6. The robot control device 11 is composed of an arithmetic processing device (computer) including a central processing unit (CPU) and a random access memory (RAM) and a read only memory (ROM) that are connected to the CPU via a bus.

The operation panel 37 of the present embodiment is connected to the robot control device 11 via a communication line. The operation panel is not limited to this configuration. The operation panel may be configured to communicate with the robot control device by radio waves.

The robot control device 11 includes a storage unit 16 that stores information on laser machining. For example, the storage unit 16 stores information on the control of the robot 2, the control of the camera 6, the control of the laser irradiation device 4, and the laser oscillator 5. For example, the storage unit 16 stores an operation program for laser machining. Furthermore, the storage unit 16 stores information that is inputted on the operation panel 37.

The robot control device 11 includes a robot control unit 12 that controls the robot 2. The robot control unit 12 includes an operation control unit 18 that controls the robot drive motor 29. The operation control unit 18 transmits an operation command to a robot drive circuit 19 based on the operation program. The operator operates the operation panel 37 such that the operation control unit 18 transmits the operation command to the robot drive circuit 19 based on the operation of the operation panel 37. The robot drive circuit 19 supplies electric power to the robot drive motor 29 based on the operation command.

The robot 2 includes a robot position detector 30 for detecting the position and orientation of the robot 2. The robot position detector 30 of the present embodiment includes an encoder attached to the robot drive motor 29. The robot control unit 12 receives a signal of a rotational position that is outputted from the robot position detector 30. The robot control device 11 can detect the position and orientation of the laser irradiation device 4 based on the position and orientation of the robot 2.

The robot control device 11 includes a camera control unit 13 that controls the camera 6. The camera control unit 13 transmits an imaging command to the camera 6 based on the operation program that is stored in the storage unit 16. Alternatively, the operator operates the operation panel 37 so that the camera control unit 13 transmits the imaging command to the camera 6. The camera 6 that has received the imaging command captures the image of the workpiece.

The robot control device 11 includes a display control unit 14 that controls the display 39 of the operation panel 37. The display control unit 14 transmits a command for displaying a predetermined image to the display 39 based on the operation program that is stored in the storage unit 16. Moreover, the display control unit 14 displays the image that is captured by the camera 6 on the display 39. The robot control device 11 includes an image processing unit 17 that processes the image captured by the camera 6. The information that is processed by the image processing unit 17 is transmitted to the display control unit 14. The display control unit 14 transmits, to the display 39, a command for displaying an image of the information processed by the image processing unit 17. The display 39 can display the image based on the command of the display control unit 14.

The robot control device 11 includes a laser control unit 15 that controls the laser beam. The laser control unit 15 transmits a command for outputting the laser beam to an irradiation control device 41 based on the operation program that is stored in the storage unit 16. Alternatively, the laser control unit 15 transmits a laser-beam irradiation command to the irradiation control device 41 when the operator operates the operation panel 37.

The control device 3 includes the irradiation control device 41 that controls the laser irradiation device 4. The irradiation control device 41 is composed of an arithmetic processing device including a CPU in the same way as the robot control device 11. The irradiation control device 41 is configured to communicate with the robot control device 11 via a communication device.

The irradiation control device 41 includes an operation control unit 42 that transmits an operation command for the output-direction adjustment mechanism 44 in the laser irradiation device 4. The operation control unit 42 transmits an operation command for driving the mirrors of the laser irradiation device 4 to a mirror drive circuit 43 based on the operation program. Alternatively, the operation control unit 42 transmits the operation command for driving the mirrors in response to an operation performed by the operator on the operation panel 37. The mirror drive circuit 43 supplies electric power to the mirror drive motor 47 based on the operation command.

The laser irradiation device 4 includes a mirror position detector 50 for detecting the orientation of the mirror. The mirror position detector 50 of the present embodiment includes an encoder that is attached to the mirror drive motor 47. The rotation angle that is detected by the mirror position detector 50 is transmitted to the operation control unit 42.

The control device 3 includes an oscillator control device 51 that controls the laser oscillator 5. The oscillator control device 51 is composed of an arithmetic processing device including a CPU in the same way as the robot control device 11. The oscillator control device 51 is configured to communicate with the irradiation control device 41 via a communication device.

The irradiation control device 41 transmits a command for oscillating the laser beam to the oscillator control device 51 based on the command from the laser control unit 15. The command from the laser control unit 15 includes the irradiation conditions of the laser beam. The irradiation conditions of the laser beam include intensity, frequency, duty ratio, and the like of the laser beam. The irradiation conditions can be transmitted from the laser control unit 15 to the irradiation control device 41. If the irradiation control device 41 has a storage unit, the irradiation conditions can be stored beforehand in the storage unit.

Alternatively, the irradiation control device 41 can store the irradiation conditions each of which includes a set of the intensity, the frequency, the duty ratio, and the like of the laser beam. Moreover, the laser control unit 15 may transmit, to the irradiation control device 41, a command for using a specific irradiation condition among a plurality of irradiation conditions. The irradiation control device 41 can control the laser irradiation device 4 and the oscillator control device 51 based on the specified irradiation condition.

The irradiation condition of the laser beam may include the timing for starting the irradiation of the laser beam and the timing for terminating the irradiation of the laser beam. The workpiece may be linearly irradiated with the laser beam. In a period in which the mirror drive motor 47 of the laser irradiation device 4 is driven, the irradiation of the laser beam may be started or stopped. In this case, the irradiation control device 41 controls the timing for laser beam irradiation. For example, when the mirror drive motor 47 is rotated at a constant speed after being started, the irradiation control device 41 starts the irradiation of the laser beam.

After the laser beam is irradiated in a desired shape, the irradiation control device 41 stops the laser beam irradiation. After that, the irradiation control device 41 performs a control for stopping the mirror drive motor 47. The oscillator control device 51 controls the laser oscillator 5 so as to oscillate the laser beam according to the irradiation condition included in the command from the irradiation control device 41.

Figure 4:
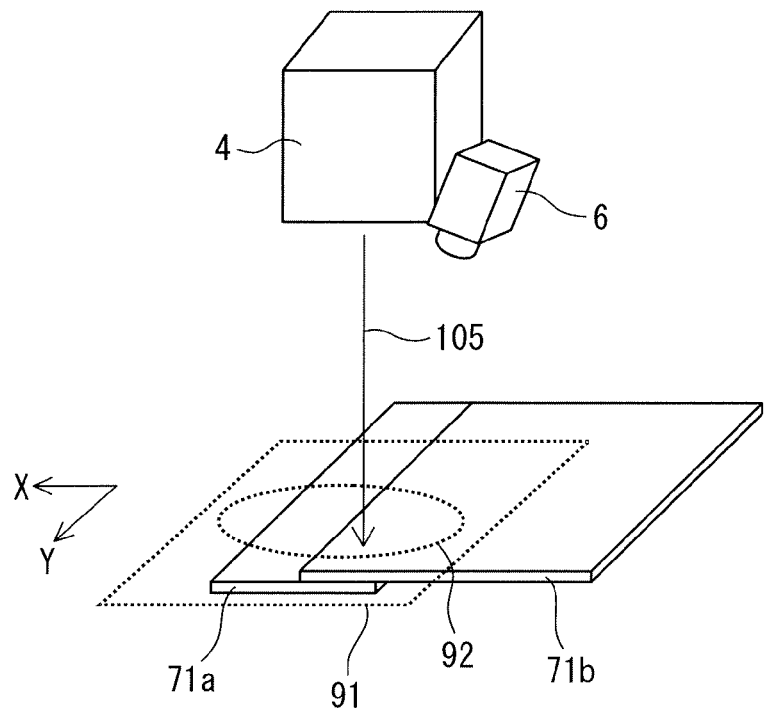
FIG. 4 is an enlarged schematic perspective view showing the laser irradiation device of the first machining system and workpieces according to the embodiment.
Figure 5:
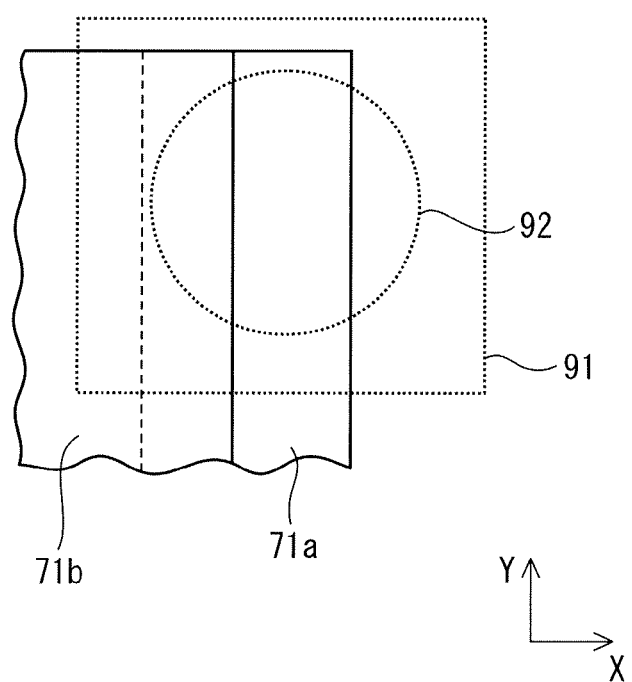
FIG. 5 is a schematic plan view showing the workpieces according to the embodiment.

FIG. 4 is an enlarged schematic diagram showing the laser irradiation device of the first machining system and the workpieces according to the present embodiment. FIG. 5 is a schematic plan view showing the workpieces according to the present embodiment. Referring to FIGS. 4 and 5, an operation for welding the two plate-like workpieces 71a and 71b will be discussed as an example in the present embodiment. The workpiece 71b is disposed on the workpiece 71a. In this case, in a region where the workpiece 71a and the workpiece 71b overlap each other, the workpieces are welded by the laser beam emitted as indicated by arrow 105.

A region 91 indicates a range where the camera 6 captures the image when the robot 2 is placed in a predetermined position and orientation. The region 92 indicates the range where laser beam irradiation is allowed when the output-direction adjustment mechanism 44 in the laser irradiation device 4 is driven. A teaching operation for setting a laser-beam irradiation position on the workpieces 71a and 71b will be first described below.

Figure 6:
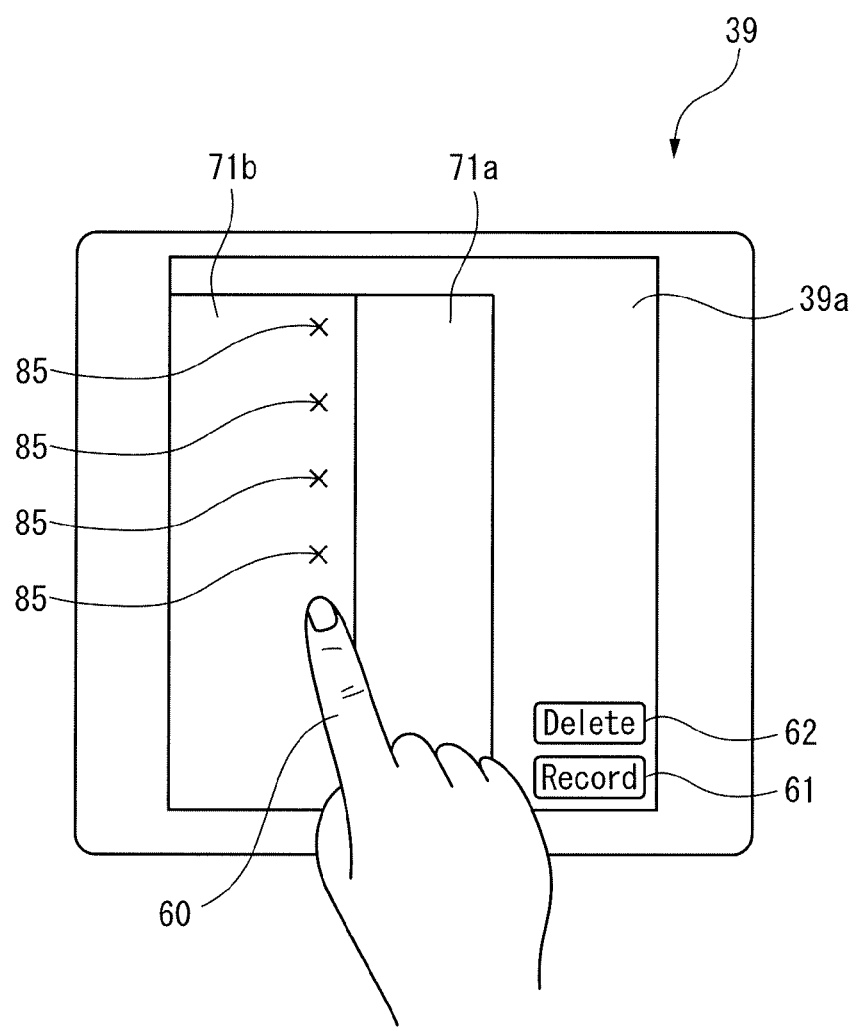
FIG. 6 shows a display indicating first image in the first machining system.

FIG. 6 shows first image that is indicated on the display in the first machining system. Referring to FIGS. 1, 2, and 6, the operator operates the input part 38 of the operation panel 37 so as to start the imaging of the camera 6. The operator operates the input part 38 and changes the position and orientation of the robot 2 so as to display a part to be machined on the display 39. The display control unit 14 displays the image that is captured by the camera 6 in an image region 39a of the display 39. In the example of FIG. 6, the camera 6 captures the image of the workpieces 71a and 71b before machining. The display 39 shows an overlap of the two workpieces 71a and 71b. Moreover, the display control unit 14 displays buttons 61 and 62 in addition to the image that is captured by the camera 6.

In the present embodiment, the workpieces 71a and 71b are fixed at predetermined positions on the pedestal 72. Before the teaching operation, the positions of the workpieces 71a and 71b on the display 39 are calibrated relative to the position and orientation of the robot 2. Moreover, the positions of the workpieces 71a and 71b on the display 39 are calibrated relative to the orientations of the mirrors of the output-direction adjustment mechanism 44 in the laser irradiation device 4. The positions of the workpieces 71a and 71b are calibrated such that the predetermined positions of the workpieces in the image on the display 39 corresponds to the predetermined positions of the actual workpieces.

Thus, if the position and orientation of the robot 2 are determined and the output direction of the laser beam is determined by the output-direction adjustment mechanism 44, the position is specified on the actual workpieces 71a and 71b according to the position specified in the image region 39a of the display 39. The laser beam irradiation position on the workpieces 71a and 71b can be specified in the image region 39a by the operator.

The camera 6 can capture the image of the workpieces 71a and 71b after the workpieces 71a and 71b are fixed to the pedestal 72. Subsequently, the image processing unit 17 of the robot control device 11 may detect the positions of the workpieces 71a and 71b by processing the captured image. For example, the image processing unit 17 detects the outlines of the workpieces 71a and 71b. The image processing unit 17 can detect the positions of the workpieces 71a and 71b on the pedestal 72 based on the border lines and the position and orientation of the robot 2.

The operator can specify the points to be welded while visually confirming the image on the display 39. A touch panel system is used for the display 39 of the present embodiment. In the image region 39a, the points to be welded are pressed by the operator with a finger 60. The display control unit 14 displays marks 85 at positions that is touched by the operator. In this way, the operator can set laser-beam irradiation positions on the workpieces 71a and 71b while visually confirming the image on the display 39. In other words, the operator can set welding positions on the screen of the display 39.

Subsequently, the operator presses a button 61, whereby the storage unit 16 stores the positions of the marks 85 that is set by the operator on the workpieces 71a and 71b. In other words, the storage unit 16 stores the welding positions on the workpieces 71a and 71b according to the teaching operation. Based on the laser-beam irradiation positions of the display 39, the robot control unit 12 can calculate the position and orientation of the robot 2 and the output direction of the laser beam in the output-direction adjustment mechanism 44. The robot control unit 12 can create the operation program so as to emit the laser beam to the positions specified by the operator.

In the example of FIG. 6, the operation program is created so as to irradiate the laser beam to multiple positions. In the operation program, the position and orientation of the robot 2 and the orientations of the mirrors of the output-direction adjustment mechanism 44 are specified so as to irradiate the laser beam to positions specified by the operator. The storage unit 16 stores the created operation program. Thereafter, the operator operates the operation panel 37, whereby the control device 3 can irradiate the laser beam according to the operation program.

Alternatively, the operation program that includes laser-beam irradiation positions on the workpieces 71a and 71b may be determined beforehand. In this case, the display control unit 14 can display the laser-beam irradiation positions on the display 39 after acquiring the operation program from the storage unit 16. The display control unit 14 can calculate the laser-beam irradiation positions that are displayed on the display 39 based on the current position and orientation of the robot 2 and the output direction of the laser beam in the output-direction adjustment mechanism 44.

The control device 3 of the present embodiment is formed such that the operator operates the operation panel 37 while visually confirming an image displayed on the display 39, thereby changing the laser-beam irradiation positions on the workpieces 71a and 71b.

In the example of FIG. 6, a button 62 for deleting the marks 85 is pressed and a desired one of the marks 85 is then pressed, whereby the welding position can be deleted. After that, another welding position is pressed with the finger 60, whereby another mark 85 can be displayed. Furthermore, the operator presses the button 61 so as to store the changed laser-beam irradiation position.

The operation for setting or changing of the laser-beam irradiation position is not limited to this embodiment, and thus, any method can be employed. For example, the position of the mark may be changed by the operation in which the mark to be changed is pressed for a while on the display, and the mark is then dragged to a desired position with the finger. Alternatively, the operator can set or change the laser-beam irradiation position by operating a keyboard or the like disposed on the input part.

The display control unit 14 of the present embodiment virtually displays the laser-beam irradiation position on the workpieces 71a and 71b on the display 39 so as to overlap the image captured by the camera 6. This allows the operator to easily confirm the laser-beam irradiation position. In particular, even if the guide laser beam is not emitted, the operator can confirm the laser-beam irradiation position for machining. Thus, the machining system 1 may not be provided with the guide laser device. As described above, the control device 3 of the present embodiment has the function of displaying an image for augmented reality on the display 39.

The control device 3 is configured to set or change the laser-beam irradiation position on the workpieces 71a and 71b based on an operation of the input part 38 of the operation panel 37. By adopting this configuration, the operator can perform the teaching operation while visually confirming the screen on the display 39. It is not necessary for the operator to operate the operation panel 37 while tracking the guide laser beam, facilitating the teaching operation for setting or changing the laser-beam irradiation position.

The display 39 also shows a state around a part to be machined. The operator can confirm the state around the part to be irradiated with the laser beam. For example, in the example of FIG. 6, the display 39 shows the state around the point to be machined. The operator can confirm that the welding position is not so close to the edges of the workpieces 71a and 71b. Moreover, the operator can confirm the absence of jigs that may interfere with laser beam irradiation.

The control device 3 can store, in the storage unit 16, laser beam irradiation positions on the display 39 based on the operation performed by the operator on the input part 38. Thus, the operator can easily store set or changed laser-beam irradiation positions in the storage unit 16 while visually confirming the screen of the display 39.

In the present embodiment, the camera 6 captures the image of the workpieces 71a and 71b before machining, but the invention is not limited to this embodiment. The camera 6 can capture the image of the workpieces 71a and 71b in the period in which the workpieces 71a and 71b are machined. The display control unit 14 can display the laser-beam irradiation position that overlaps the image of the workpieces 71a and 71b in the period in which the machining is performed. By adopting this control, the operator can confirm that the machining is performed at the specified position in the period in which the machining is performed.

Figure 7:
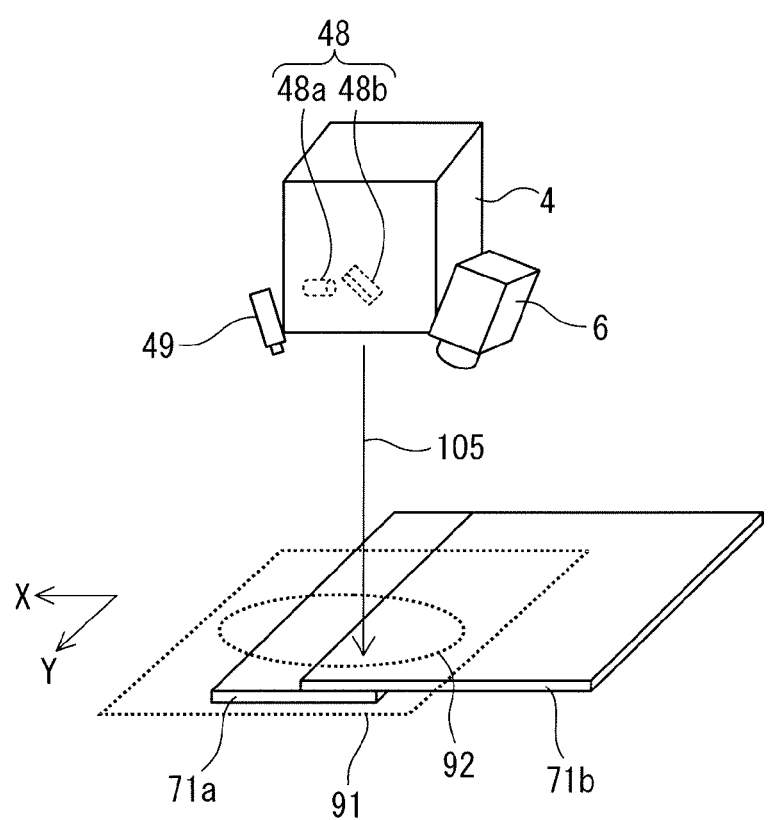
FIG. 7 is an enlarged schematic perspective view showing the laser irradiation device of second machining system and the workpieces according to the embodiment.

FIG. 7 is an enlarged schematic diagram showing the laser irradiation device of second machining system and the workpieces according to the present embodiment. In the second machining system, the laser irradiation device 4 includes a guide laser device 48 that irradiates a position to be machined on the workpieces 71a and 71b. The guide laser device 48 of the present embodiment is disposed in the laser irradiation device 4. The guide laser device 48 includes a light source 48a that outputs visible light as the guide laser beam and a mirror 48b that reflects the guide laser beam. The guide laser device 48 can irradiate the laser-beam irradiation position for machining, according to the current position and orientation of the robot and the orientations of the mirrors of the output-direction adjustment mechanism 44.

The second machining system further includes a measurement device 49 that measures the distance between the laser irradiation device 4 and the workpieces 71a and 71b.

The measurement device 49 of the present embodiment irradiates the surfaces of the workpieces 71 and 71b with the guide beam so as to display an auxiliary line in the circular shape on the surfaces of the workpieces 71 and 71b as will be discussed later. The irradiation control device 41 includes a guide laser control unit that controls the guide laser device 48 and a measurement device control unit that controls the measurement device 49.

Figure 8:
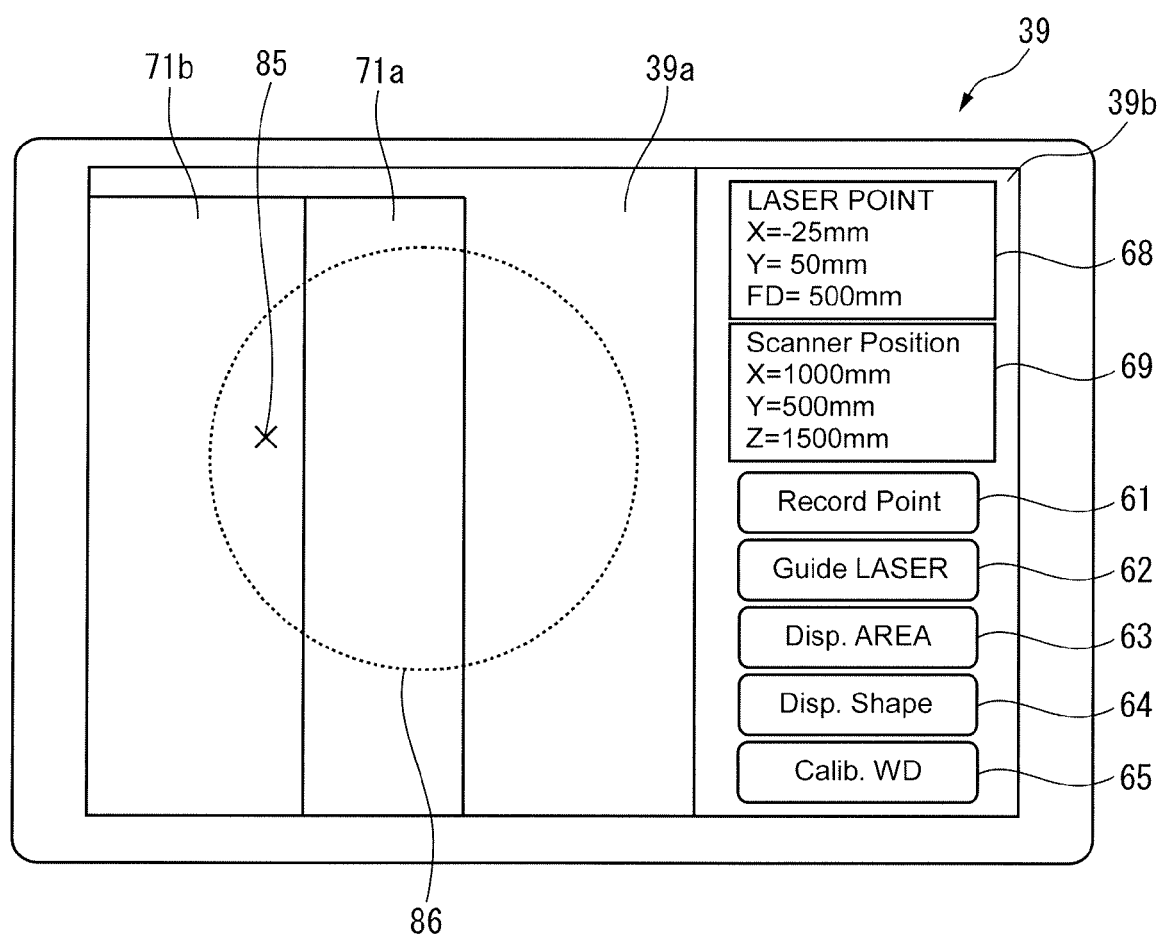
FIG. 8 shows the display indicating second image in the second machining system.

FIG. 8 shows a display indicating second image in the second machining system. The display 39 has an image region 39a where the image captured by the camera 6 is displayed and an information region 39b where information on laser machining is displayed. In the information region 39b, buttons 61 to 65 for the operations of the operator are displayed. In the example of FIG. 8, the workpieces 71a and 71b are displayed in the image region 39a. Moreover, in the image region 39a, a mark 85 that corresponds to the laser-beam irradiation position is displayed.

The information region 39b has display regions 68 and 69. In the display region 68, the laser-beam output position of the laser irradiation device 4 is displayed. In this example, in the display region 68, the position of an outputted laser beam in the X axis and the position of the laser beam in the Y axis with an origin located at the center of the focusing lens are displayed. Moreover, in the display region 68, a current focal distance FD is displayed. In the display region 69, the position of the laser irradiation device 4 is displayed. In this example, the position of a tool center point in the robot coordinate system of the robot 2 is displayed as the position of the laser irradiation device 4.

As described above, the control device 3 displays information on the laser-beam irradiation position and information on the position of the laser irradiation device 4 on the display 39. The operator can confirm the laser-beam irradiation position and the position of the laser irradiation device as numeric values. In the present embodiment, the control device 3 displays both of the information on laser-beam irradiation positions and the information on the laser irradiation device 4, but the invention is not limited to this embodiment. The control device 3 may display only one of the information.

The display control unit can display the information on the laser-beam irradiation positions in any form. For example, the display control unit may display the coordinate value of the laser-beam irradiation position in a workpiece coordinate system that has an origin located at any position of the workpiece. The display control unit can display the position of the laser irradiation device in any form. For example, the position of the laser irradiation device relative to the workpiece can be displayed by using coordinate values.

In the present embodiment, the screen of the display 39 is divided into the image region 39a and the information region 39b, but the embodiment is not limited to this. The regions may be displayed as other screens (windows). For example, another screen may be opened so as to form the information region 39b on the image region 39a.

In the information region 39b, a button 61 for storing set or changed the position on the workpieces 71a and 71b is arranged. The irradiation control device 41 of the present embodiment is configured to control the guide laser device 48 based on an operation performed by the operator in the input part 38. The operator operates the operation panel 37 while visually confirming the screen of the display 39, whereby the guide laser device 48 is operated. In the information region 39b, a button 62 for operating the guide laser device 48 is arranged. When the operator presses the button 62, the guide laser beam can be outputted from the guide laser device 48. When the operator presses the button 62 again, the guide laser device 48 can be stopped. The position where the workpieces 71a and 71b are irradiated with the guide laser beam corresponds to the actual laser-beam irradiation position.

The operator can confirm whether or not the irradiation position of the guide laser beam and the position of the mark 85 on the screen are displaced from each other on the display 39. The irradiation position of the guide laser beam and the position of the mark 85 on the screen may be displaced from each other. In this case, the operator can perform a calibration so as to match the position of the mark 85 to the position irradiated by the guide laser beam. The control device 3 can be configured to perform the calibration in response to the operation that is performed by the operator on the operation panel 37. In this way, the position of the laser beam for machining can be confirmed by using the guide laser beam.

Referring to FIG. 3, the laser irradiation device 4 of the present embodiment includes the output-direction adjustment mechanism 44 that adjusts the direction of the laser beam that is outputted from the laser irradiation device 4. In the second machining system, the control device 3 virtually displays a range in which the laser beam can be irradiated by the output-direction adjustment mechanism 44 on the workpieces 71a and 71b so as to overlap the image of the workpieces 71a and 71b on the display 39. In other words, the display 39 indicates a range in which the laser beam can be moved by the output-direction adjustment mechanism 44.

Referring to FIG. 8, the operator presses button 63 so as to display an auxiliary line 86 that overlaps the image of the workpieces 71a and 71b that is actually captured. The range surrounded by the auxiliary line 86 corresponds to the range of the laser beam that is moved by the laser irradiation device 4 when the robot 2 is stopped. The operator can specify the welding position in the range in which the laser-beam irradiation can be performed by the laser irradiation device 4. When the welding point is set outside the auxiliary line 86, the operator can change the position and orientation of the robot 2.

In the example of FIG. 8, the imaging range of the camera 6 is wider than the range in which the laser beam can be irradiated and that is indicated by the auxiliary line 86. In other words, the image is displayed so as to contain the overall auxiliary line 86. By adopting this configuration, the operator can confirm the overall range in which the laser beam can be irradiated by driving the output-direction adjustment mechanism 44. Thus, the operator can easily set the welding point in the range in which the laser beam can be irradiated by driving the output-direction adjustment mechanism 44. Moreover, the robot 2 is operated through the operation panel 37, whereby the range that is indicated by the auxiliary line 86 can be moved easily. When the operator presses the button 63 again, the auxiliary line 86 can be deleted from the screen.

In the galvanoscanner that includes the output-direction adjustment mechanism 44 shown in FIG. 3, the range in which the laser beam can be irradiated on the workpieces is quadrilateral in plan view. At the corners of the quadrilateral shape, however, the laser beam may have a convergence error so as to reduce the accuracy of machining. Thus, in the present embodiment, the corners of the quadrilateral shape are removed, and the range of the auxiliary line 86 in which the laser beam can be irradiated is displayed as a circle that is contained in the quadrilateral shape. In other words, in the present embodiment, the region with high machining accuracy is displayed by the auxiliary line 86. The display control unit may display a quadrilateral auxiliary line where the position of the laser beam can be adjusted by the galvanoscanner. Alternatively, the quadrilateral auxiliary line and the circular auxiliary line may be switched each time when the button 63 is pressed.

Figure 9:
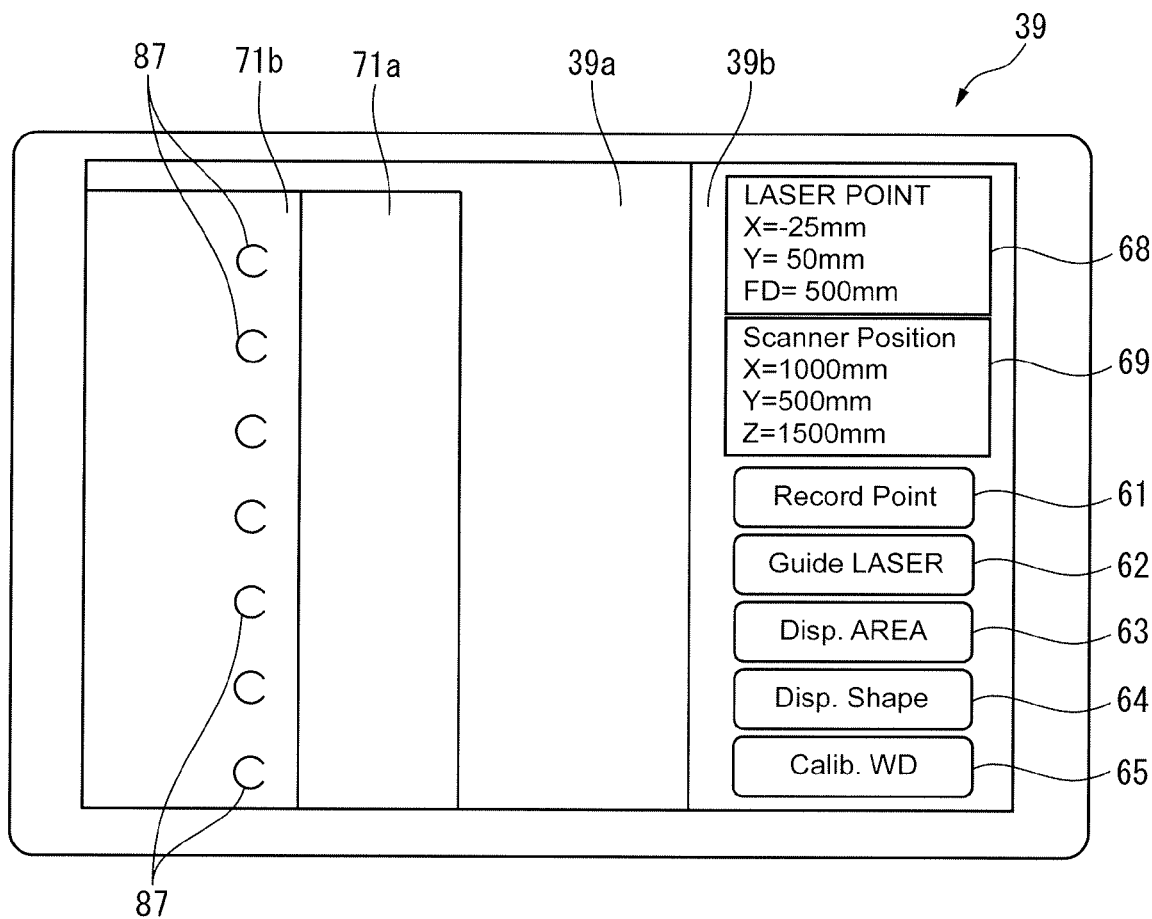
FIG. 9 shows the display indicating third image in the second machining system.

FIG. 9 shows the display indicating third image in the second machining system. In the second machining system, the control device 3 can virtually display a shape of the machined workpieces 71a and 71b so as to overlap a captured image of the workpieces 71a and 71b on the display 39. For example, the display control unit 14 can calculate the shape of the machined workpiece based on the operation program. The display control unit 14 can display the shape of the machined workpiece on the display 39 based on the laser-beam irradiation position that is currently set.

During laser beam irradiation, the output-direction adjustment mechanism 44 of the laser irradiation device 4 is driven so as to perform the welding in any shape. The operator presses a button 64 so as to display the shape of the machined workpieces 71a and 71b on the display 39. In the example of FIG. 9, the laser beam is emitted in the form of a partially cut circle at a welding position. Marks 87 are displayed as the shapes of the machined workpieces. The shape of laser beam irradiation can be set beforehand in an operation program. The display control unit 14 can display the shapes of the machined workpieces based on the operation program that is stored in the storage unit 16.

The welding shape is not limited to the partially cut circle and thus any shape can be used. For example, the welding shape may be circular in plan view with an internal region entirely irradiated by the laser beam, or the welding shape may be the form of the letter S.

The display 39 displays the shapes of the machined workpieces 71a and 71b, whereby the operator can confirm the shapes of the machined workpieces before the machining or during the machining. If the shapes after the machining are not appropriate, the operator can change the irradiation position of the laser beam.

The second machining system includes a measurement device 49 that measures the distance (height) between the laser irradiation device 4 and the workpieces 71a and 71b. In other words, the measurement device 49 can measure the workpiece distance. The irradiation control device 41 of the control device 3 is configured to control the measurement device 49 based on an operation on the input part 38 of the operation panel 37.

For example, the measurement device 49 may be a device that emits visible light in a circular form to the workpieces 71a and 71b. When the distance between the workpieces 71a and 71b and the laser irradiation device 4 is short, a small circle is displayed on the display 39. The control device 3 can estimate the distance from the laser irradiation device 4 to the workpieces 71a and 71b based on the size of the circle displayed on the display 39. The image processing unit 17 can measure the distance between the workpieces 71a and 71b and the laser irradiation device 4 based on the diameter of the circle in the captured image.

In the second machining system, the operator operates the operation panel 37 while visually confirming the screen of the display 39, whereby the measurement device 49 is operated. The operator can operate the measurement device 49 by pressing button 65. In the present embodiment, when the operator presses button 65, the distance (height) between the laser irradiation device 4 and the workpieces 71a and 71b is measured and then the measurement result is displayed on the screen of the display 39.

The measured distance can be displayed in the information region 39b. For example, in the information region 39b, another information region (window) is opened so as to display the measurement result. If the measured distance is equal to the focal length, the workpieces 71a and 71b can be irradiated with a proper laser beam.

If the distance measured by the measurement device 49 is deviated from the focal length of the laser irradiation device 4, the focal length of the laser irradiation device 4 can be corrected. The laser irradiation device 4 of the present embodiment can automatically adjust the position of the focusing lens so that the focal length is equal to the distance that is measured by the measurement device 49. If the distance measured by the measurement device 49 is deviated from the focal length of the laser irradiation device 4, the operator can change the position and orientation of the robot 2 so that the distance displayed on the display 39 is equal to the focal length.

The measurement device is not limited to the foregoing configuration. Any device that is capable of measuring the distance from the laser irradiation device to the workpieces can be used. For example, the measurement device may be a measurement device that measures distance under irradiation with a cross laser beam, a measurement device that uses ultrasonic waves, or a measurement device that measures the distance by processing an image captured by a three-dimensional camera.

Referring to FIG. 3, the output-direction adjustment mechanism 44 that is disposed in the laser irradiation device 4 according to the present embodiment is a mechanism that includes a plurality of mirrors. The output-direction adjustment mechanism is not limited to this configuration and can be any mechanism that is capable of changing the output direction of the laser beam.

Figure 10:
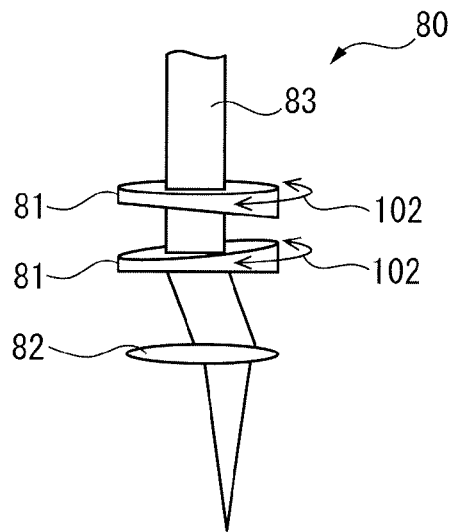
FIG. 10 is an explanatory drawing showing the internal mechanism of a trepanning head.

FIG. 10 is a schematic diagram showing another configuration of the output-direction adjustment mechanism. A laser machining head that includes an output-direction adjustment mechanism 80 in FIG. 10 is referred to as a trepanning head. The output-direction adjustment mechanism 80 is disposed in the laser irradiation device 4. The output-direction adjustment mechanism 80 adjusts the output direction of the laser beam through lenses 81. In the example of FIG. 10, the output-direction adjustment mechanism 80 includes a plurality of the lenses 81 and a focusing lens 82. The lenses 81 can refract an incoming laser beam. The output-direction adjustment mechanism 80 includes a motor that rotates the lenses 81 as indicated by arrows 102.

The lenses 81 are rotated so as to adjust the position of the laser beam 83 incident on the focusing lens 82. As a result, the laser beam can be emitted to a desired position on a two-dimensional plane. In this way, the output-direction adjustment mechanism may include lenses instead of mirrors.

In the present embodiment, the control device 3 includes the multiple control devices, that is, the robot control device 11, the irradiation control device 41, and the oscillator control device 51, but the embodiment is not limited to this. The control devices may be integrated into a single unit. For example, the robot control device may have the function of the irradiation control device. Alternatively, the irradiation control device may have the function of the oscillator control device.

Furthermore, the control device may have any configuration that can control at least the imaging device including the camera and the display. For example, in a machining system not provided with a support device for supporting the laser machining head, the position of the workpiece and the position of the imaging device may be fixed. In such a machining system, a control device controls the imaging device including a camera and a display.

In the present embodiment, the welding was described as an example of laser machining, but the embodiment is not limited to this. The machining system of the present embodiment is applicable to any laser machining. For example, the machining system of the present embodiment is applicable to a machining system for cutting a workpiece, a machining system for punching a workpiece, and a machining system for engraving a workpiece.

The machining system according to an aspect of the present disclosure facilitates confirmation of the laser-beam irradiation position on the workpiece.

The foregoing embodiment may be optionally used in a combined manner. In the drawings, the same or equivalent parts are indicated by the same symbols. The embodiment is merely exemplary and thus does not limit the invention. Moreover, the embodiment includes a change described in claims.

The invention claimed is:

1. A machining system comprising:
a laser machining head that outputs a laser beam to a workpiece from a position separated from the workpiece;
an adjustment mechanism that adjusts a direction of the laser beam outputted from the laser machining head,
an imaging device that captures an image of the workpiece;
a display that displays the image captured by the imaging device; and
a control device that controls the imaging device and the display, wherein
the adjustment mechanism includes a robot supporting the laser machining head and an output-direction adjustment mechanism that is disposed in the laser machining head and adjusts an output direction of the laser beam,
a position of the workpiece displayed on the display is calibrated relative to a position and orientation of the robot,
a position of the laser beam irradiated on the workpiece displayed on the display is calibrated relative to a state of a mechanism for setting the direction of the laser beam in the output-direction adjustment mechanism,
the imaging device captures the image of the workpiece before machining or during machining, and
the control device virtually displays a laser-beam irradiation position on the display so as to overlap a workpiece image captured by the imaging device, and
when an operator specifies the laser-beam irradiation position on a screen, the laser-beam irradiation position overlapping the workpiece displayed on the display in a state in which the adjustment mechanism is stopped, the control device:
calculates the position and orientation of the robot and a state of the output-direction adjustment mechanism for irradiating the laser beam at the laser-beam irradiation position specified on the screen by the operator, and
moves the robot to the calculated position and orientation and irradiates the laser beam at the laser-beam irradiation position specified on the screen by the operator,
wherein the control device virtually displays a range in which the laser beam is configured to be irradiated by the output-direction adjustment mechanism on the workpiece so as to overlap the image of the workpiece on the display.

2. The machining system according to claim 1, wherein the imaging device captures the image in a range that is wider than a range in which the laser beam can be irradiated by the output-direction adjustment mechanism on the workpiece.

3. The machining system according to claim 1, wherein the control device calculates a shape of the machined workpiece and displays virtually a shape of the machined workpiece on the display so as to overlap a workpiece image captured before the machining.

4. The machining system according to claim 1, further comprising an operation panel including the display and an input part operated by an operator, wherein
the control device is configured to set or change the laser-beam irradiation position based on the operation of the input part.

5. The machining system according to claim 1, further comprising an operation panel including the display and an input part operated by an operator and a guide laser device irradiating a position to be machined on the workpiece, wherein
the control device is configured to control the guide laser device based on the operation of the input part.

6. The machining system according to claim 1, further comprising an operation panel including the display and an input part operated by an operator, wherein
the control device includes a storage unit that stores information on laser machining, and
the laser-beam irradiation position displayed on the display is stored in the storage unit based on the operation of the input part.

7. A machining system comprising:
a laser machining head that outputs a laser beam to a workpiece from a position separated from the workpiece;
an adjustment mechanism that adjusts a direction of the laser beam outputted from the laser machining head,
an imaging device that captures an image of the workpiece;
a display that displays the image captured by the imaging device; and
a control device that controls the imaging device and the display, wherein
the adjustment mechanism includes a robot supporting the laser machining head and an output-direction adjustment mechanism that is disposed in the laser machining head and adjusts an output direction of the laser beam,
a position of the workpiece displayed on the display is calibrated relative to a position and orientation of the robot,
a position of the laser beam irradiated on the workpiece displayed on the display is calibrated relative to a state of a mechanism for setting the direction of the laser beam in the output-direction adjustment mechanism,
the imaging device captures the image of the workpiece before machining or during machining, and
the control device virtually displays a laser-beam irradiation position on the display so as to overlap a workpiece image captured by the imaging device, and
when an operator specifies the laser-beam irradiation position on a screen, the laser-beam irradiation position overlapping the workpiece displayed on the display in a state in which the adjustment mechanism is stopped, the control device:
calculates the position and orientation of the robot and a state of the output-direction adjustment mechanism for irradiating the laser beam at the laser-beam irradiation position specified on the screen by the operator, and
moves the robot to the calculated position and orientation and irradiates the laser beam at the laser-beam irradiation position specified on the screen by the operator,
wherein the control device displays at least one of information on the laser-beam irradiation position and information on a position of the laser machining head on the display.

8. A machining system comprising:
a laser machining head that outputs a laser beam to a workpiece from a position separated from the workpiece;
an adjustment mechanism that adjusts a direction of the laser beam outputted from the laser machining head,
an imaging device that captures an image of the workpiece;
a display that displays the image captured by the imaging device; and
a control device that controls the imaging device and the display, wherein
the adjustment mechanism includes a robot supporting the laser machining head and an output-direction adjustment mechanism that is disposed in the laser machining head and adjusts an output direction of the laser beam,
a position of the workpiece displayed on the display is calibrated relative to a position and orientation of the robot,
a position of the laser beam irradiated on the workpiece displayed on the display is calibrated relative to a state of a mechanism for setting the direction of the laser beam in the output-direction adjustment mechanism,
the imaging device captures the image of the workpiece before machining or during machining, and
the control device virtually displays a laser-beam irradiation position on the display so as to overlap a workpiece image captured by the imaging device, and
when an operator specifies the laser-beam irradiation position on a screen, the laser-beam irradiation position overlapping the workpiece displayed on the display in a state in which the adjustment mechanism is stopped, the control device:
calculates the position and orientation of the robot and a state of the output-direction adjustment mechanism for irradiating the laser beam at the laser-beam irradiation position specified on the screen by the operator, and
moves the robot to the calculated position and orientation and irradiates the laser beam at the laser-beam irradiation position specified on the screen by the operator; and
an operation panel including the display and an input part operated by an operator and a measurement device that measures a distance between the laser machining head and the workpiece, wherein the control device is configured to control the measurement device based on the operation of the input part.

* * * * *